United States Patent Office …

3,313,761
STABILIZED VINYL CHLORIDE POLYMER
Wendell A. Barnes, Cheswick, and Norman W. Franke,
Penn Hills Township, Allegheny County, Pa., assignors
to Gulf Research & Development Company, Pittsburgh,
Pa., a corporation of Delaware
No Drawing. Filed June 24, 1963, Ser. No. 290,248
9 Claims. (Cl. 260—31.8)

This invention relates to improvements in resinous vinyl chloride electrical wire coating compositions. In particular, this invention relates to improved stabilizers for use in resinous vinyl chloride type electrical wire coating compositions.

The use of compositions containing vinyl chloride polymers or copolymers for electrical wire insulation is well known in the art. These vinyl chloride polymer compositions comprise a resinous vinyl chloride polymer, a plasticizer and one or more stabilizers. One of the indicia of a good resinous vinyl chloride polymer formulation for electrical insulation is the percent retention of elongation after an accelerated aging at elevated temperatures. The Underwriters' approval varies from 50 to 70 percent retention for various types of thermoplastic insulated wire. The resinous vinyl chloride polymer compositions of this invention have unexpectedly excellent percent retention of elongation properties after aging as well as good color properties.

In accordance with the invention, improved plastic electrical wire coating compositions comprise a resinous vinyl chloride polymer, a neutral branched-chain alkyl ester, having between 6 and 13 carbon atoms per alkyl group, of a polybasic acid, and a substituted phenol stabilizer having the general formula:

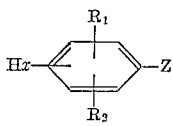

wherein $x$ is selected from the group consisting of oxygen and sulfur; $R_1$ and $R_2$ are selected from the group consisting of —H, —OH, —SH, and a saturated alkyl radical having between 1 and 12 carbon atoms; and Z is selected from the group consisting of

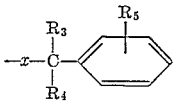

where $x$ is as defined above; $R_3$ and $R_4$ are selected from the group consisting of —H and a saturated alkyl radical having between 1 and 3 carbon atoms and where the sum of the carbon atoms in $R_3$ and $R_4$ is an integer less than 4; and $R_5$ is selected from the group consisting of —H, and a saturated alkyl radical having between 1 and 12 carbon atoms;

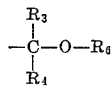

where $R_3$ and $R_4$ are as defined above, and $R_6$ is a saturated alkyl radical having between 1 and 4 carbon atoms; and

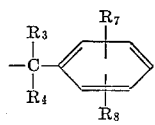

where $R_3$ and $R_4$ are as defined above, and $R_7$ and $R_8$ are selected from the group consisting of —H and a saturated alkyl radical having between 1 and 12 carbon atoms; and wherein the concentration of the substituted phenol stabilizer is between about 0.08 and 5 weight percent of the polymer when Z is

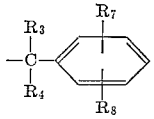

where $R_7$, $R_8$, $R_3$ and $R_4$ are as defined above, and wherein the concentration of the substituted phenol stabilizer is between about 0.5 and 5 weight percent of the polymer when Z is selected from the group consisting of

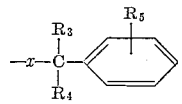

where $x$, $R_5$, $R_3$ and $R_4$ are as defined above; and

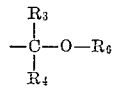

where $R_3$, $R_4$ and $R_6$ are as defined above.

The compositions of this invention comprise a resinous vinyl chloride polymer. By a resinous vinyl chloride polymer is meant a resinous homopolymer of vinyl chloride or a resinous copolymer of vinyl chloride and other suitable monomers such as vinyl acetate, wherein at least 85 weight percent of the copolymer is vinyl chloride. The copolymer is preferably between 85 and 97 weight percent vinyl chloride. A resinous homo- or copolymer is one which is substantially solid at room temperature.

Various esters are known in the art to be useful as plasticizers for vinyl chloride type polymers. Branched-chain neutral alkyl esters, such as those obtained by the esterification of polybasic acids with branched-chain alcohols having between 6 and 13 carbon atoms per molecule, are particularly suitable for this purpose. The esters should be neutral, that is, no free acid groups should remain after esterification. The desirable polybasic acids or anhydrides are normally those having between 2 and 4 carboxyl groups and between 4 and 14 carbon atoms per molecule. Dibasic acids or anhydrides are preferred which have between 5 and 10 carbon atoms per molecule. Suitable specific examples of polybasic acids include phthalic acid; phthalic anhydride; adipic; pimelic; succinic; cumenyl succinic; sebacic; azelaic; diglycolic; isophthalic; and trimellitic. The most preferred acid is phthalic acid.

The branched chain alcohols required for preparing the ester plasticizers of the compositions of this invention can be obtained from any suitable source. For example, 2-ethylhexyl alcohol can suitably be employed. The preferred alcohols, however, are those produced by the hydroformylation of branched-chain olefins (the celebrated oxo process). A typical isomer distribution for isooctyl alcohol is given on page 33 of the book, "Higher Oxo Alcohols," by L. F. Hatch, New York, John Wiley and Sons, 1957. The oxo alcohols consist of isomers having at least one tertiary carbon atom, and usually the isomers have two tertiary carbon atoms. The tridecyl alcohol ($C_{13}$) predominates in tetramethylnonanols. The higher oxo alcohols apparently have no isomers with a quaternary carbon atom.

The esters can be prepared by any suitable procedure. One suitable procedure comprises contacting the selected alcohol with the selected dibasic acid in the presence of a strong mineral acid, such as sulfuric, and recovering the desired ester therefrom.

The amount of ester plasticizer in the resinous vinyl chloride polymer compositions of this invention can vary between 20 and 80 weight percent of the vinyl chloride polymer and preferably is between 30 and 60 weight percent. Secondary plasticizers well known in the art can also suitably be employed, such as t-butyl naphthalene.

Stabilizers are used to reduce the degradation of the resinous vinyl chloride polymer from various causes such as heat and light. These stabilizers are more commonly known as hydrogen chloride acceptors. Various stable metal compounds are employed as hydrogen chloride acceptors. By "stable metal compounds" is meant at least one compound of a metal selected from the group consisting of cadmium, barium, zinc, tin and lead which does not decompose and has essentially no volatility at 350° F. and atmospheric pressure. One suitable class of metal compounds are the basically reacting metal salts of organic acids having between 1 and 20 carbon atoms. Another suitable class of metal compounds are the basically reacting metal sulfates. Still another class of suitable metal compounds are the basically reacting metal silicate sulfates. Lead stabilizers are used in practically all of the commercial polyvinylchloride electrical compounds. Suitable specific examples of known stabilizers for use in resinous polyvinylchloride include dibasic lead phthalate, basic lead silicate sulfate, hydrous tribasic lead sulfate, dibasic lead stearate, dibasic lead carbonate, dibasic lead phosphate, dibutyl tin dilaurate and dibutyl tin diacetate. The preferred stabilizers include dibasic lead phthalate, basic lead silicate sulfate and hydrous tribasic lead sulfate.

The concentration of the above metal compounds stabilizers to employ can vary from about 1 to 12 weight percent of the resinous vinyl chloride polymer with preferred amounts between 3 and 10 weight percent.

It has been found, however, that where branched-chain ester plasticizers, such as those prepared from oxo alcohols, are employed, the addition of metal compound stabilizers is not sufficient. This is found to be particularly true when the resinous vinyl chloride polymer is destined for use in a coating composition for electrical wire insulation, since the resinous vinyl chloride polymer with the metal compound stabilizer alone does not meet the requirements for retention of elongation after aging.

Certain auxiliary stabilizing agents have now been found which, when added to resinous vinyl chloride polymers, unexpectedly improve the vinyl chloride polymers, especially as a coating composition for electrical wire insulation, since the retention of elongation of the resinous vinyl chloride polymer after aging is exceptionally high. While it is not certain just how these auxiliary stabilizers work, it is believed the auxiliary stabilizers prevent thermal degradation of the branched-chain ester in addition to aiding in preventing the thermal degradation or decomposition of the resinous vinyl chloride polymer. The auxiliary stabilizers of this invention are the substituted phenols having the general formula:

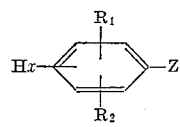

wherein $x$ is selected from the group consisting of oxygen and sulfur; $R_1$ and $R_2$ are selected from the group consisting of —H, —OH, —SH, and a saturated alkyl radical having between 1 and 12 carbon atoms; and Z is selected from the group consisting of

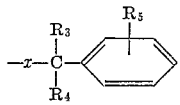

where $x$ is as defined above; $R_3$ and $R_4$ are selected from the group consisting of —H and a saturated alkyl radical having between 1 and 3 carbon atoms and where the sum of the carbon atoms in $R_3$ and $R_4$ is an integer less than 4; and $R_5$ is selected from the group consisting of —H, and a saturated alkyl radical having between 1 and 12 carbon atoms;

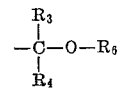

where $R_3$ and $R_4$ are as defined above, and $R_6$ is a saturated alkyl radical having between 1 and 4 carbon atoms; and

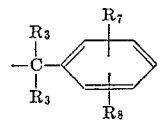

where $R_3$ and $R_4$ are as defined above, and $R_7$ and $R_8$ are selected from the group consisting of —H and a saturated alkyl radical having between 1 and 12 carbon atoms.

The preferred auxiliary stabilizers are those wherein $R_1$, $R_2$, $R_5$, $R_7$ and $R_8$ are selected from the group consisting of —H and a saturated alkyl radical having between 1 and 4 carbon atoms. Suitable specific examples of representative compounds include hydroquinonebenzyl ether (hydroquinone monobenzyl ether); hydroquinone (2-methylbenzyl) ether; hydroquinone (3-ethylbenzyl) ether; hydroquinone (4-propylbenzyl) ether; hydroquinone (4-t-butylbenzyl) ether; hydroquinone (alpha-methylbenzyl) ether; hydroquinone (alpha,alpha-dimethylbenzyl) ether; hydroquinone (alpha-methyl-4-propylbenzyl) ether; monohydrothioquinonebenzyl ether; monohydrothioquinone (2-methylbenzyl) ether; monohydrothioquinone (4-t-butylbenzyl) ether; monohydrothioquinone (alpha,alpha-diethylbenzyl) ether; monohydrothioquinone (alpha,alpha-dimethyl-4-propylbenzyl) ether; dihydrothioquinone (4-t-butylbenzyl) ether; 2,6-di-tert-butyl-alpha-methoxy-p-cresol; 2-methyl-alpha-methoxy-p-cresol; 2-tert-butyl-alpha-methoxy-p-cresol; 3-propyl-alpha-propoxy-p-cresol; 3-butyl-alpha-butoxy-p-cresol; 2,6-di-tert-butyl-alpha-propoxy-p-cresol; 2,6-di-tert-butyl-alpha-butoxy-p-cresol; 2,6-di-isopropyl-alpha-methoxy-p-cresol; 2,6-di-ethyl-alpha-ethoxy-p-cresol; 2,6-di-tert-butyl-alpha-methoxy-p-thiocresol; 3-propyl-alpha-propoxy-p-thiocresol; 4-hydroxydiphenylmethane; 2-hydroxydiphenylethane; 3-hydroxydiphenylethane; 4-hydroxydiphenylethane; 4-hydroxy-2,2-diphenylpropane; 3-hydroxy-1,1-diphenylpropane; 3-hydroxy-1,1-diphenylbutane; 2-hydroxy-4'-propyl-1,1-diphenylethane; 4'-butyl-4-hydroxy-1,1-diphenylethane; 4-hydroxy-2-octyldiphenylmethane; 2-mercaptodiphenylethane; 4-mercapto-2-ethyl-4'-butyl-2,2-diphenylpropane; and 4-hydroxy-4-dodecyl-2'-propyl-diphenylethane. The most preferred compounds are 2,6-di-t-butyl-alpha-methoxy-p-cresol; hydroquinone monobenzyl ether and monohydroxydiphenylethane.

The amount of substituted phenol stabilizer to employ depends on the type of substituted phenol. When Z in the above formula is

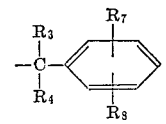

where $R_3$, $R_4$, $R_7$ and $R_8$ are as defined above, lower concentrations can be employed. Thus, substituted phenols having the general formula:

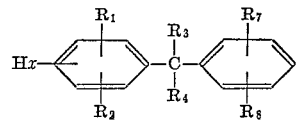

where $x$ is selected from the group consisting of O and S; $R_1$ and $R_2$ are selected from the group consisting of —H; —OH; —SH, and a saturated alkyl radical having between 1 and 12 carbon atoms; $R_3$ and $R_4$ are selected from the group consisting of —H and a saturated alkyl radical having between 1 and 3 carbon atoms and where the sum of the carbon atoms in $R_3$ and $R_4$ is an integer less than 4; and $R_7$ and $R_8$ are selected from the group consisting of —H and a saturated alkyl radical having between 1 and 12 carbon atoms can be employed in concentrations between about 0.08 and 5 weight percent of the vinyl chloride polymer with preferred concentrations between 0.1 and 4 weight percent.

When Z in the above general formula is selected from the group consisting of

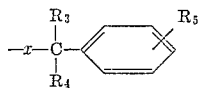

where $x$, $R_3$, $R_4$ and $R_5$ are as defined above; and

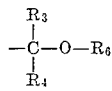

where $R_3$, $R_4$ and $R_6$ are as defined above, a higher concentration of substituted phenol is required, but within the range between 0.5 and 5 weight percent of the vinyl chloride polymer with preferred concentrations between 0.8 and 4 weight percent.

The substituted phenol stabilizers of this invention can be prepared in any manner well known in the art and form no part of this invention. For example, the hydroquinone monobenzyl ethers may be prepared via the Williamson ether synthesis as described in "Organic Synthesis" by V. R. Migrdichian, page 77 (1957), Reinhold Publishing Corp., New York, New York. This same reference (page 537) also describes the Wartz-Tollens-Fittig reaction for the preparation of hydroxylated, alkylated diphenyl alkanes.

Fillers can also suitably be employed in the compositions of the subject invention if desired. The function of a filler is sometimes solely as a low-cost extender, but a filler can be employed to impart additional desired properties to the resinous polyvinylchloride. A finely divided clay is used as the principal filler in the vinyl electrical compositions of the subject invention. Other suitable fillers include calcium carbonate, silica and alumina. The amount of filler can very between 0 and 50 weight percent of the polyvinylchloride with preferred amounts between 5 and 20 weight percent.

A lubricant, such as stearic acid, can also be employed to aid in processing the compositions of this invention. The amount of lubricant can vary between 0.1 and 1.0 weight percent of the polyvinylchloride with preferred amounts between 0.2 and 0.5 weight percent.

Insulated electric wire is classified as to the maximum temperature to which it is subjected in use. Underwriters' Laboratories set the standards for most of the building and appliance wire used in the United States. Since the phthalate esters and the resinous vinyl chloride type electrical wire compounds plasticized with them are regarded as having satisfactory electrical properties, the critical test that they must pass to be used in electrical insulation is the retention of elongation after oven aging.

Underwriters' Laboratories has an accelerated aging test in a mechanical convection oven for wire compounds. In this test the wire compound is subjected to a temperature above that of its maximum operating temperature in use, as designated by its class for seven days. To pass this test the wire compound must have a minimum retention of elongation as shown in Table I below. The percent retention of the property is calculated by dividing the value measured on a specimen after oven aging by the value obtained on an unaged specimen taken from the same sheet.

TABLE I

| Class | Oven Temp., °C. | Time in Oven, days | Percent Retention, Elongation |
|---|---|---|---|
| 80° C. Appliance Wire [1] | 113 | 7 | 65 |
| 90° C. Appliance Wire [1] | 121 | 7 | 65 |
| 105° C. Appliance Wire [1] | 136 | 7 | 65 |

[1] Underwriters' Laboratories, Inc. Subject 758, issued October 5, 1950, revised March 21, 1961, entitled "Outline of Proposed Investigation Thermoplastic-Insulated Appliance Hook-Up Wire."

The 80° C., 90° C. and 105° C. appliance wires, formerly called radio hook-up wire, are for the indicated maximum temperature and are used, as the name indicates, in electrical appliances.

In oven aging runs made in an unmodified oven the variations in elongation retention were found to be greater than ±10 percent. In this type of oven the results depended more on the position of the specimen in the oven than on the compoistion of the sample. Since Underwriters' Laboratories use an unmodified oven in this test, insulated wire manufacturers put a safety factor in their wire formulations. While the unmodified open simulates commercial practice it is too erratic to determine small differences in auxiliary stabilizers. To overcome this difficulty, an Apex-Royen tubular oven unit was installed in a Blue M Model POM–120 RAZ oven. The tubular oven has dampers to control the air flow over the specimens in each tube. The air flow over the specimens seems to be as important as the temperatures.

In the examples which follow, the vinyl chloride polymer compositions were subjected to the 105° C. wire test. In the 105° C. wire tests two dumbbell shaped specimens were placed in each of the sixteen tubes of the oven and were aged 7 days at 136° C. with an air flow of 400 ft./min. and with the fresh air inlet one-fourth open.

To calibrate the oven, the 105° C. test was run on Geon 8630, a commercial 105° C. wire compound made by B. F. Goodrich Chemical Company. Geon 8630 was found in this work to have an average elongation retention of 80 percent in the 105° C. test, which is within the range claimed for this material.

Test specimens had the following compositions:

100 parts of resinous vinyl chloride polymer;
50 parts of ditridecylphthalate plasticizer;
15 parts of filler;
7 parts of a metal compound stabilizer;
0.5 part of a lubricant; and between 0 and 1 part of an auxiliary stabilizer.

The resinous vinyl chloride polymer (Geon 101) was a copolymer of vinyl chloride and vinyl acetate in a 95:5 ratio of monomers. The ditridecylphthalate plasticizers had a molecular weight of 530, a specific gravity of 0.950, a boiling point at 3.5 mm. Hg of 285° C., a pour point of —35, a flash point of 455, a viscosity at 25° C. of 190 cps. and a refractory index of 1.484.

The filler was a light colored fine mesh #33 clay purchased from the Southern Clay Company.

The metal compound stabilizer was dibasic lead phthalate.

The lubricant was stearic acid.

The exact amount and type of auxiliary stabilizer is given in each of the examples below.

The ingredients were mixed for 10 minutes and the premixed composition was placed on hot rolls of a 6" x 13" laboratory mill, and milled for 7 minutes at 340°–345° F. during which time the sheet was cut back and forth to thoroughly blend the stcok. A 6" x 6" panel of the 50 mil sheet from the mill was prepared for testing by molding in a hydraulic press at 330° F. under 1,000 pounds pressure for five minutes and 10,000 pounds pressure for an additional five minutes.

All of the samples were aged at constant temperature and humidity (73°±2° F., 50±2 percent relative humidity) for a minimum of 24 hours before and after oven aging.

Example 1

In this example, 1.0 phr. of hydroquinone monobenzyl ether was employed as the auxiliary stabilizer. The term "phr." means parts per hundred part of resin. The percent retention of elongation was 79. The resin color was medium gray.

Example 2

Example 1 was repeated except only 0.2 phr. of hydroquinone monobenzyl ether was employed as the auxiliary stabilizer. The percent retention of elongation was only 20.

A comparison of Examples 1 and 2 shows that a concentration of hydroquinone monobenzyl ether greater than 0.2 phr., but less than 1.0, is suitable in the compositions of this invention to obtain acceptable retention of elongation properties.

Example 3

In this example, 0.1 phr. of a styrenated phenol having the general formula:

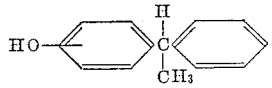

was employed as the auxiliary stabilizer. A light gray composition was obtained which had a percent retention of elongation of 83.

Example 4

Example 3 was repeated except only 0.05 phr. of the styrenated phenol was employed. The percent retention of elongation was 12.

A comparison of Examples 3 and 4 shows that for auxiliary stabilizers of the styrenated phenol type, concentrations above 0.05 but below 0.1 are suitable in compositions of this invention to obtain acceptable retention of elongation properties.

Example 5

In this example, 1.0 phr. of 2,6-di-tertiary-butyl-alpha-methoxy-paracresol was employed as the auxiliary stabilizer. The percent retention of elongation was 87.

Example 6

Example 5 was repeated except only 0.2 phr. of the auxiliary stabilizer was employed. The percent retention of elongation was less than 30.

A comparison of Examples 5 and 6 shows that a concentration greater than 0.2 phr. but less than 1.0 of the type of auxiliary stabilizer employed is suitable in preparing compositions of this invention which have acceptable retention of elongation properties.

Example 7

In this example, 1.0 phr. of 2,6-ditertiary-butyl-paracresol was employed as the auxiliary stabilizer. The percent retention of elongation was less than 30.

A comparison of Examples 5 and 7 shows the unexpected benefit of the alpha-methoxy group on the activity of the substituted hindered phenols for preparing vinyl chloride polymer compositions suitable for use for electrical wire coatings.

Example 8

In this example, no auxiliary stabilizer was employed. The percent retention of elongation was only about 12.

A comparison of Example 8 with Examples 1, 3 and 5 shows the unexpected beneficial effect of the auxiliary stabilizers of the invention.

Resort may be had to such variations and modifications as fall within the spirit of the invention and the scope of the appended claims.

We claim:

1. A composition of matter consisting essentially of a major portion of a resinous vinyl chloride polymer, between 20 and 80 weight percent of the polymer of a neutral branched-chain alkyl ester, having between 6 and 13 carbon atoms per alkyl group, of a polybasic acid; between 1 and 12 weight percent of the polymer of at least one stable hydrogen chloride acceptor metal compound selected from the group consisting of compounds of cadmium, barium, zinc, tin and lead; and a substituted phenol stabilizer selected from the group consisting of monohydroxy-diphenylethane and 2,6 - di-tertiary-butyl-alpha-methoxy-paracresol, wherein the concentration is between 0.08 and 5 weight percent of the polymer when the stabilizer is monohydroxy diphenylethane and the concentration is between 0.05 and 5 weight percent of the polymer when the stabilizer is 2,6-di-tertiary-butyl-alpha-methoxy-paracresol.

2. A composition according to claim 1 wherein the vinyl chloride polymer is a resinous copolymer of vinyl chloride and vinyl acetate wherein the weight percent vinyl chloride is at least 85 percent.

3. A composition according to claim 2 wherein the metal compound stabilizer is dibasic lead phthalate.

4. A composition according to claim 2 wherein the neutral branched-chain ester is ditridecylphthalate.

5. A composition according to claim 2 wherein the stabilizer is 2,6 - di-tertiary-butyl-alpha-methoxy-paracresol.

6. A composition according to claim 2 wherein the stabilizer is monohydroxy-diphenylethane.

7. A composition according to claim 6 wherein the concentration of stabilizer is between 0.1 and 4 weight percent of the polymer.

8. A composition according to claim 5 wherein the concentration of stabilizer is between 0.8 and 4 weight percent of the polymer.

9. A composition of matter suitable for use as an electrical wire coating composition consisting essentially of a major portion of a resinous vinyl chloride polymer, between 20 and 80 percent of the polymer of a neutral branched-chain alkyl ester, having between 6 and 13 carbon atoms per alkyl group, of a polybasic acid; between 1 and 12 weight percent of the polymer of at least one stable hydrogen chloride acceptor metal compound selected from the group consisting of compounds of cadmium, barium, zinc, tin and lead; and a substituted phenol stabilizer selected from the group consisting of monohydroxy-diphenylethane and 2,6 - di-tertiary-butyl-alpha-methoxy-paracresol, wherein the concentration is between 0.08 and 5 weight percent of the polymer when the stabilizer is monohydroxy-diphenylethane and the concentration is between 0.05 and 5 weight percent of the polymer when the stabilizer is 2,6-di-tertiary-butyl-alpha-methoxy-paracresol.

References Cited by the Examiner

UNITED STATES PATENTS 2,985,617   5/1961   Salyer et al. _____ 260—45.95
3,217,004  11/1965   Hechenbleikner et al. _ 260—31.8

OTHER REFERENCES

The Stabilization of Polyvinyl Chloride, Chevassus et al., St. Martins Press, Inc. 1963, pp. 58, 59, 60, 278–280, 281.

MORRIS LIEBMAN, *Primary Examiner.*

JULIUS FROME, *Examiner.*

UNITED STATES PATENT OFFICE
CERTIFICATE OF CORRECTION

Patent No. 3,313,761                                              April 11, 1967

Wendell A. Barnes et al.

It is hereby certified that error appears in the above numbered patent requiring correction and that the said Letters Patent should read as corrected below.

Column 4, lines 12 to 17, for the bottom portion of the formula reading "$R_3$" read -- $R_4$ --; column 5, line 48, for "very" read -- vary --; column 6, line 23, for "open" read -- oven --; line 69, for "stcok" read -- stock --.

Signed and sealed this 14th day of November 1967.

(SEAL)
Attest:

Edward M. Fletcher, Jr.

Attesting Officer

EDWARD J. BRENNER

Commissioner of Patents